(12) United States Patent
Hakoshima

(10) Patent No.: US 8,876,507 B2
(45) Date of Patent: Nov. 4, 2014

(54) TIRE MOLD

(75) Inventor: Eiichi Hakoshima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/984,055

(22) PCT Filed: Feb. 6, 2012

(86) PCT No.: PCT/JP2012/052621
§ 371 (c)(1),
(2), (4) Date: Aug. 7, 2013

(87) PCT Pub. No.: WO2012/111467
PCT Pub. Date: Aug. 23, 2012

(65) Prior Publication Data
US 2013/0330433 A1   Dec. 12, 2013

(30) Foreign Application Priority Data
Feb. 15, 2011   (JP) .................................. 2011-029585

(51) Int. Cl.
*B29C 33/10*   (2006.01)
*B29D 30/06*   (2006.01)

(52) U.S. Cl.
CPC ...... *B29D 30/0606* (2013.01); *B29D 2030/062* (2013.01); *B29D 2030/0617* (2013.01); *Y10S 425/812* (2013.01)
USPC .............................. 425/28.1; 425/36; 425/812

(58) Field of Classification Search
CPC ............................................... B29D 2030/0617
USPC ......................................... 425/28.1, 36, 812
See application file for complete search history.

(56) References Cited

U.S. PATENT DOCUMENTS 3,467,988 A * 9/1969 Zaffaroni et al. ............... 425/36

FOREIGN PATENT DOCUMENTS

| JP | 55-63733 | 5/1980 |
| JP | 63-264308 A | 11/1988 |
| JP | 2005-178333 A | 7/2005 |
| JP | 2008-307800 A | 12/2008 |
| JP | 2011-16327 A | 1/2011 |

OTHER PUBLICATIONS

Japanese Office Action for Application No. 2011-029585 dated Oct. 15, 2013 (with English translation).
International Search Report for PCT/JP2012/052621 mailed on Apr. 3, 2012.
Written Opinion of the International Searching Authority for PCT/JP2012/052621 mailed on Apr. 3, 2012. (Japanese).

* cited by examiner

*Primary Examiner* — James Mackey
(74) *Attorney, Agent, or Firm* — Birch, Stewart, Kolasch & Birch, LLP

(57) ABSTRACT

A tire mold comprising a pair of side plates, a pair of bead rings abutting on the side plates, and a gas venting passage, wherein each of the bead rings has: a cavity surface; an outer side surface; and an outer peripheral surface having two regions, wherein a first and second outer peripheral surface adjoins the cavity surface. A first gap is lying between the first outer peripheral surface and the side plate by the presence of a knurled groove. A second gap is lying between the second outer peripheral surface and the side plate. A third gap is lying between the outer side surface and the side plate by the presence of a plurality of vent grooves. The first to third gaps function as the gas venting passage.

16 Claims, 4 Drawing Sheets

| | Optimum range | Comparative example 1 Prior art | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|---|
| Presence or absence of knurling on or side surface of bead ring | | Absence | Presence | Presence | Presence | Presence | Presence | Presence | Presence | Presence | Presence | Presence | Presence | Presence | Presence | Presence |
| Presence or absence of small outside diameter part of side surface of bead ring | | Absence | Presence | Presence | Presence | Presence | Presence | Presence | Presence | Presence | Presence | Presence | Presence | Presence | Presence | Presence |
| Presence or absence of the grooves provided in upper surface of the bead ring | | Absence | Presence | Presence | Presence | Presence | Presence | Presence | Presence | Presence | Presence | Presence | Presence | Presence | Presence | Presence |
| width of knurled part (mm) | 8-12 | | 12 | 12 | 6 | 14 | 8 | 12 | 12 | 12 | 12 | 12 | 12 | 12 | 12 | 12 |
| knurling pitch (mm) | 1.2-2.0 | | 1.5 | 1.5 | 1.5 | 1.5 | 1.5 | 1.5 | 1.5 | 1.5 | 1.5 | 1.5 | 1.5 | 1.5 | 1.5 | 1.5 |
| height from bottom to peak of knurled groove (mm) | 0.54-0.83 | | 0.62 | 0.62 | 0.62 | 0.62 | 0.62 | 0.62 | 0.62 | 0.62 | 0.62 | 0.62 | 0.62 | 0.62 | 0.62 | 0.62 |
| types of knurling (diamond knurling, straight knurling) | diamond | | diamond | straight | diamond | diamond | diamond | diamond | diamond | diamond | diamond | diamond | diamond | diamond | diamond | diamond |
| outside diameter difference from reference outside surface of small outside diameter part (mm) | 2.5-4.0 | | 3.0 | 3.0 | 3.0 | 3.0 | 3.0 | 3.0 | 3.0 | 3.0 | 3.0 | 3.0 | 1.5 | 5.0 | 2.0 | 4.0 |
| width of grooves provided in upper part of the bead ring (mm) | 1.5-4.0 | | 2.0 | 2.0 | 2.0 | 2.0 | 2.0 | 2.0 | 2.0 | 2.0 | 2.0 | 2.0 | 2.0 | 2.0 | 2.0 | 2.0 |
| depth of grooves provided in upper part of the bead ring (mm) | 0.5-1.5 | | 1.0 | 1.0 | 1.0 | 1.0 | 1.0 | 1.0 | 1.0 | 1.0 | 1.0 | 1.0 | 1.0 | 1.0 | 1.0 | 1.0 |
| number of grooves provided in upper part of the bead ring | 4-30 | | 18 | 18 | 18 | 18 | 18 | 18 | 18 | 18 | 18 | 18 | 18 | 18 | 18 | 18 |
| occurrence rate of flaw (bare) on surface of bead part due to insufficient gas venting (%) | | 8.84 | 1.65 | 4.70 | 3.70 | 1.46 | 2.25 | 1.75 | 2.98 | 1.57 | 2.12 | 1.67 | 2.87 | 1.46 | 2.34 | 1.88 |
| occurrence rate of entry of rubber residues (1mm or larger) into gas venting passage due to too large size between side plate and bead ring (%) | | 8.23 | 1.54 | 1.86 | 1.35 | 2.87 | 1.42 | 2.13 | 1.98 | 3.78 | 1.47 | 2.03 | 1.45 | 3.46 | 1.50 | 2.86 |
| meaning of such example | | Prior art | Optimum | different type of knurling | width of knurling part: less than lower limit | width of knurling part: more than upper limit | width of knurling part: lower limit | width of knurling part: upper limit | knurling pitch and hight: less than lower limit | knurling pitch and hight: more than upper limit | knurling pitch and hight: lower limit | knurling pitch and hight: upper limit | outside diameter difference of small outside diameter part: lower than lower limit | outside diameter difference of small outside diameter part: more than upper limit | outside diameter difference of small outside diameter part: lower limit | outside diameter difference of small outside diameter part: upper limit |

Fig. 6

| | Optimum range | Example 15 | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|---|
| Presence or absence of knurling on side surface of bead ring | | Presence | Presence | Presence | Presence | Presence | Presence | Presence | Presence | Presence | Presence | Presence | Presence |
| Presence or absence of small outside diameter part of side surface of bead ring | | | Presence | Presence | Presence | Presence | Presence | Presence | Presence | Presence | Presence | Presence | Presence |
| Presence or absence of the grooves provided in upper surface of the bead ring | | Presence | Presence | Presence | Presence | Presence | Presence | Presence | Presence | Presence | Presence | Presence | Presence |
| width of knurled part (mm) | 8-12 | 12 | 12 | 12 | 12 | 12 | 12 | 12 | 12 | 12 | 12 | 12 | 12 |
| knurling pitch (mm) | 1.3-2.0 | 1.5 | 1.5 | 1.5 | 1.5 | 1.5 | 1.5 | 1.5 | 1.5 | 1.5 | 1.5 | 1.5 | 1.5 |
| height from bottom to peak of knurled groove (mm) | 0.54-0.83 | 0.62 | 0.62 | 0.62 | 0.62 | 0.62 | 0.62 | 0.62 | 0.62 | 0.62 | 0.62 | 0.62 | 0.62 |
| types of knurling (diamond knurling, straight knurling) | diamond | diamond | diamond | diamond | diamond | diamond | diamond | diamond | diamond | diamond | diamond | diamond | diamond |
| outside diameter difference from reference surface of small outside diameter part (mm) | 2.0-4.0 | 3.0 | 3.0 | 3.0 | 3.0 | 3.0 | 3.0 | 3.0 | 3.0 | 3.0 | 3.0 | 3.0 | 3.0 |
| width of grooves provided in upper part of the bead ring (mm) | 1.0-4.0 | 0.5 | 5.0 | 1.0 | 4.0 | 2.0 | 2.0 | 2.0 | 2.0 | 2.0 | 2.0 | 2.0 | 2.0 |
| depth of grooves provided in upper part of the bead ring (mm) | 0.5-1.5 | 1.0 | 1.0 | 1.0 | 1.0 | 0.3 | 2.0 | 0.5 | 1.5 | 1.0 | 1.0 | 1.0 | 1.0 |
| number of grooves provided in upper part of the bead ring | 4-30 | 18 | 18 | 18 | 18 | 18 | 18 | 18 | 18 | 3 | 40 | 4 | 30 |
| occurrence rate of flaw (bare) on surface of bead part due to insufficient gas venting (%) | | 2.43 | 1.43 | 1.89 | 1.76 | 2.57 | 1.36 | 2.13 | 1.67 | 3.48 | 1.45 | 2.05 | 1.65 |
| occurrence rate of entry of rubber residues (1mm or larger) into gas passage due to too large gaps between side plate and bead ring (%) | | 1.25 | 2.67 | 1.43 | 2.12 | 1.33 | 2.57 | 1.48 | 2.32 | 1.24 | 2.87 | 1.49 | 1.58 |
| meaning of each example | | width of grooves in upper part: less than lower limit | width of grooves in upper part: more than upper limit | width of grooves in upper part: lower limit | width of grooves in upper part: upper limit | depth of grooves in upper part: less than lower limit | depth of grooves in upper part: more than upper limit | depth of grooves in upper part: lower limit | depth of grooves in upper part: upper limit | number of grooves in upper part: less than lower limit | number of grooves in upper part: more than upper limit | number of grooves in upper part: lower limit | number of grooves in upper part: upper limit |

TIRE MOLD

TECHNICAL FIELD

The present invention relates to a tire mold used in a tire vulcanization process. More specifically, it relates to a tire mold which has a knurled gas venting passage.

BACKGROUND ART

The tire vulcanization process is performed by placing a green tire in a mold and pressurizing and heating the green tire in a cavity formed by the mold and a bladder.

In this tire vulcanization process, gas is generated by cross-linking reaction. When the generated gas remains between the tire and the mold, a bare (flaw on the tire surface) is formed that causes deterioration of tire quality.

In order to discharge the gas into the outside air, a tire mold has been proposed in which a vent groove is provided on a bead ring to form a gas venting passage (saw-cut) (for example, Patent Document 1).

PRIOR ART DOCUMENT

Patent Document

[Patent Document 1] JP 2005-178333 A

SUMMARY OF THE INVENTION

Problem to be Solved by the Invention

However, in such a conventional tire mold, since the number of gas venting portions is limited, gas venting cannot be performed sufficiently, and in the process of using the tire mold repeatedly, the entrance of the gas venting passage is clogged with rubber residues, which makes gas venting more insufficient.

Accordingly, it is considered to change or clean the mold more frequently. However, after performing vulcanization to some extent (approximately 1000 tires or more), the occurrence rate of bares increases.

The present invention is made in view of the above-mentioned respects, and an object thereof is to provide a tire mold capable of reducing the occurrence rate of bares and the occurrence rate of the entry of rubber residues into the gas venting passage.

Means for Solving the Problem

Hereinafter, various embodiments of the invention will be explained.

The invention includes
a tire mold comprising: a pair of side plates; a pair of bead rings abutting on the side plates; and a gas venting passage lying between the side plates and the bead rings, wherein
each of the bead rings has: a cavity surface; an outer side surface situated opposite to the cavity surface; and an outer peripheral surface connecting the cavity surface and the outer side surface,
the outer peripheral surface has two regions in a direction of a bead ring thickness, one region being referred to as a first outer peripheral surface adjoining the cavity surface and the other region being referred to as a second outer peripheral surface adjoining the outer side surface,
a first gap is lying between the first outer peripheral surface and the side plate by the presence of a knurled groove on the first outer peripheral surface,
a second gap is lying between the first outer peripheral surface and the side plate by making an outside diameter of the second outer peripheral surface smaller than an outside diameter of the first outer peripheral surface,
a third gap is lying between the outer side surface and the side plate by the presence of a plurality of vent grooves on the outer side surface, and
the first to third gaps function as the gas venting passage.

In an embodiment of the inventive tire mold, a width of the knurled groove is 8 to 16 mm.

In an embodiment of the inventive tire mold, the knurled groove is a diamond knurling, the knurling pitch is 1.3 to 2.0 mm, and the height from a bottom to a peak of the knurled groove is 0.54 to 0.83 mm.

In an embodiment of the inventive tire mold, the outside diameter of the second outer peripheral surface is smaller than the outside diameter of the first outer peripheral surface by 2.0 to 4.0 mm.

In an embodiment of the inventive tire mold, the width of vent grooves is 1.0 to 4.0 mm and the depth of vent grooves is 0.5 to 1.5 mm.

In an embodiment of the inventive tire mold, the number of vent grooves is four to 30.

Effects of the Invention

According to the present invention, the occurrence rate of bares and the occurrence rate of the entry of rubber residues into the gas venting passage can be reduced.

BRIEF DESCRIPTION OF THE DRAWINGS

FIG. 5 A table showing examples and a comparative example

FIG. 6 A table showing examples a comparative example

MODE FOR CARRYING OUT THE INVENTION

Hereinafter, based on an embodiment of the present invention, explanations will be given with reference to the drawings.

1. General Structure of a Tire Mold

Figure 1:
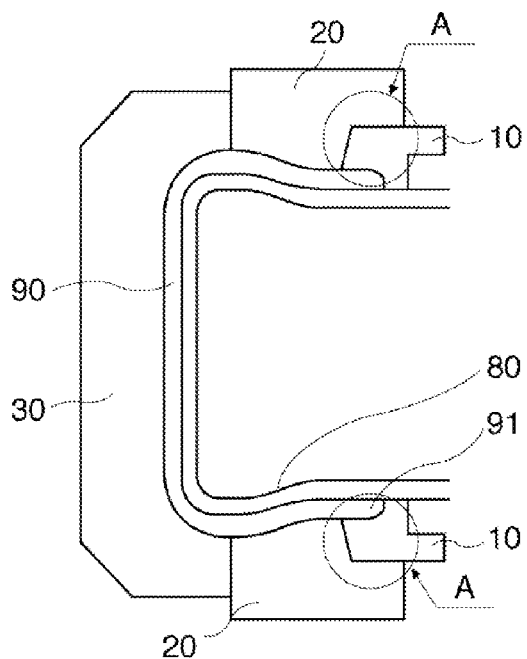
FIG. 1 A cross-sectional view schematically showing a tire mold of an embodiment of the present invention FIG. 2 A view showing part of a bead ring of the embodiment of the present invention; (a) is a perspective view and (b) is a I-I cross-sectional view of (a)
Figure 2:
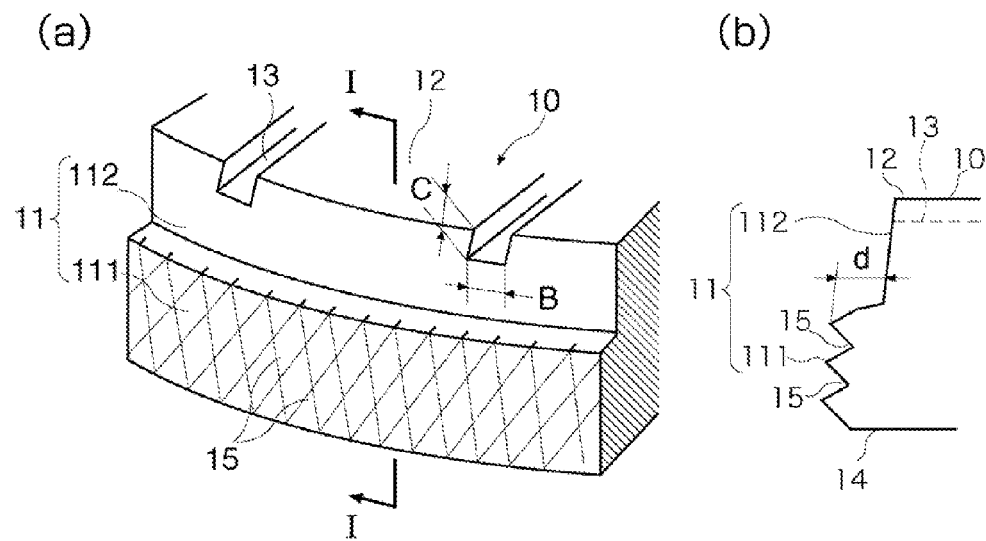
Figure 3:
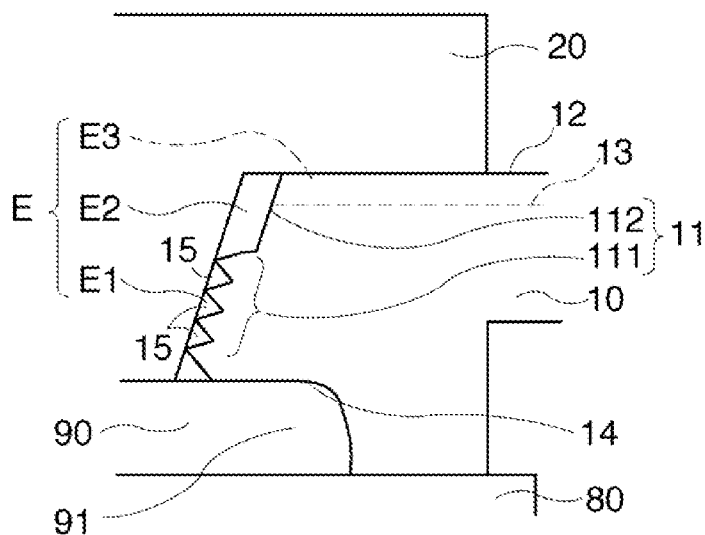
FIG. 3 An enlarged view of part A of FIG. 1

FIG. 1 is a cross-sectional view schematically showing a tire mold of the embodiment of the present invention. FIG. 2 is a view showing part of a bead ring of the embodiment of the present invention, wherein (a) is a perspective view and (b) is a I-I cross-sectional view of (a). FIG. 3 is an enlarged view of part A of FIG. 1.

As shown in FIG. 1, the tire mold has a pair of side plates 20, a pair of bead rings 10 abutting on the side plates 20, and a tread plate 30.

As shown in FIG. 3, a gas venting passage E is lying between the side plate 20 and the bead ring 10. The gas venting passage E consists of a first gap E1, a second gap E2 and a third gap E3.

In FIG. 1 and FIG. 3, reference numeral 80 represents a bladder, reference numeral 90 represents a green tire, and reference numeral 91 represents a bead part thereof.

As shown in FIG. 2, the bead ring 10 has a cavity surface 14, an outer side surface 12 situated opposite to the cavity surface 14, and an outer peripheral surface 11 connecting the cavity surface 14 and the outer side surface 12. The outer peripheral surface 11 has two regions in the direction of the ring thickness. One region is referred to as a first outer peripheral surface 111 and the other region is referred to as a second outer peripheral surface 112.

As shown in FIG. 2, the first outer peripheral surface 111 has knurled grooves 15 on the entire surface. Since the outside diameter of the second outer peripheral surface 112 is smaller than that of the first outer peripheral surface 111, a level difference d is provided between the second outer peripheral surface 112 and the first outer peripheral surface 111.

As shown in FIG. 2, the outer side surface 12 has vent grooves 13 elongated in the direction of the ring diameter. The vent grooves 13 are elongated in the direction of the ring diameter, and are provided along the entire length of the outer side surface 12 in the direction of the width.

2. Gas Venting Passage

The gas venting passage E consists of the first gap E1, the second gap E2 and the third gap E3 as mentioned above.

(1) First gap

The first gap E1 is lying between the first outer peripheral surface 111 and the side plate 20 by the presence of the knurled grooves 15 on the first outer peripheral surface 111.

In general, there are two types of knurling, straight knurling and diamond knurling. In the present embodiment, diamond knurling is adopted where grooves are interconnected and the number of gaps is large, and, hence gas is passed effectively.

The width of the knurled grooves 15 is preferably 8 to 16 mm, and most suitably approximately 12 mm. When the width is less than 8 mm, gas venting is insufficient. When it exceeds 16 mm, the entry of rubber residues is excessive.

Figure 4:
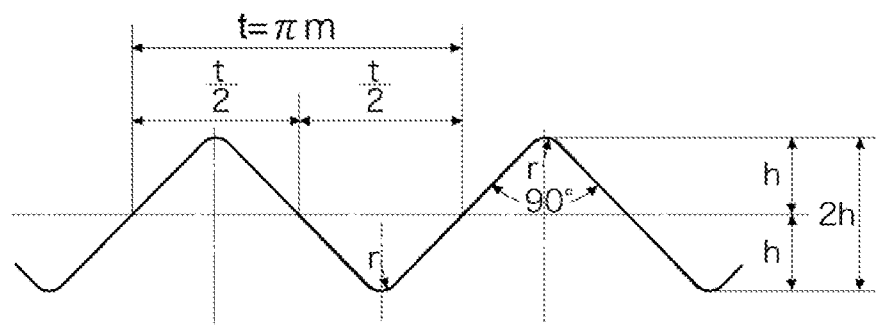
FIG. 4 A view for explaining knurling

FIG. 4 is a view for explaining the configuration and size of the crests and grooves (troughs) of knurling. As shown in FIG. 4, the crests and grooves are aligned in a straight line, the crossing angle between the oblique sides forming the crests and grooves is 90 degrees, and when m is the module, t is the pitch of the crests and grooves, h is the height of the crests and the depth of the grooves and r is the radius of the crests and grooves, relationships of $t=\pi m$, $h=0.785\ m-0.414\ r$ and $r=0.1068\ t-0.0085$ hold.

Moreover, since the crest configuration used in knurling is fixed, as shown in FIG. 4, the height 2 h from the bottom to the peak of the knurled grooves 15 with respect to the pitch t changes with a correlation. For example, when the pitch t is 1.3 mm, the height 2 h is approximately 0.54 mm, and when the pitch t is 2.0 mm, the height 2 h is approximately 0.83 mm.

According to an investigation by the present inventor, when the pitch t and the height 2 h are less than 1.3 mm and less than 0.54 mm, respectively, since the knurled grooves 15 are so small that the passage of gas is poor, bares due to insufficient gas venting are formed in the vulcanized tires, and the frequency of occurrence of poor quality products increases. On the other hand, when the pitch t exceeds 2.0 mm and the height 2 h exceeds 0.83 mm, since the gaps are too large, it is concerned that the entry of rubber residues into the first gap E1 is excessive.

Therefore, as the combination of the pitch t and the height 2 h, 1.3 to 2.0 mm and 0.54 to 0.83 mm, respectively, are preferable. As the pitch t, approximately 1.5 mm is the most suitable, and, as the height 2 h, approximately 0.62 mm is the most suitable.

(2) Second Gap

The second gap E2 is lying between the second outer peripheral surface 112 and the side plate 20 by the level difference of the second outer peripheral surface 112.

The outside diameter difference between the second outer peripheral surface 112 and the first outer peripheral surface 111 is 2.0 to 4.0 mm. That is, the level difference d between the second outer peripheral surface 112 and the first outer peripheral surface 111, as shown in FIG. 2(b), is preferably 1.0 to 2.0 mm, and most suitably, approximately 1.5 mm.

This is because an outside diameter difference of less than 2.0 mm is insufficient for storing gas having passed through the first gap E1, and entry of rubber residues into the first gap E1 is concerned since the gas passed excessively when an outside diameter difference is more than 4.0 mm.

(3) Third Gap

The third gap E3 is lying between the outer side surface 12 and the side plate 20 by the presence of the vent grooves 13 of the outer side surface 12.

The width B of the vent grooves 13 is preferably 1.0 to 4.0 mm, and most suitably, approximately 2.0 mm. The depth C of the vent grooves 13 is preferably 0.5 to 1.5 mm, and most suitably, approximately 1.0 mm. The sizes are defined from the viewpoint of smoothly discharging the gas having passed through the first gap E1 and the second gap E2 into the outside air.

The number of vent grooves 13 is preferably four to 30, and more preferably, 16 to 20. This is because when the number is less than four, the gas cannot be sufficiently discharged into the outside air and when the number exceeds 30, the improvement in gas discharging effect cannot be expected and the design of the bead ring 10 is complicated. The vent grooves 13 are provided at equal spaces in the circumferential direction of the bead ring 10.

3. Effects of the Present Embodiment (1) Regarding the first gap E1 of the gas venting passage E, by knurling the outer peripheral surface of the bead ring 10, the gas passage can be dramatically increased compared with the conventional gas venting passage E.

(2) Regarding the second gap E2, since the outside diameter of the bead ring 10 is small, the gap can be provided along the entire perimeter of the bead ring 10, so that the gas having passed through the knurled grooves 15 can be sufficiently stored.

(3) Regarding the third gap E3, since it is unnecessary to consider the entry of rubber residues, the vent grooves 13 can be made sufficiently large. Consequently, the gas stored in the second gap E2 can be discharged into the outside air with high reliability.

(4) By the linkage of the first gap E1, the second gap E2 and the third gap E3, the occurrence rate of bares and the occurrence rate of the entry of rubber residues into the gas venting passage E can be reduced, so that high-quality tires can be manufactured efficiently.

(5) Moreover, by appropriately setting as described above the width, pitch and height of the knurled grooves 15 as the first gap E1, the outside diameter of the second outer peripheral surface 112 as the second gap E2, the width and depth of the vent grooves 13 as the third gap E3, and the like, the entry of rubber residues can be reduced to an appropriate range (not more than 1 mm), so that the occurrence rate of bares and the occurrence rate of the entry of rubber residues into the gas venting passage E can be reduced more reliably.

(6) In particular, since a large number of gas venting passages E can be secured by knurling, even when vulcanization is performed repeatedly, poor gas venting due to clogging with rubber residues or the like does not readily occur, which is particularly effective from a practical standpoint.

EXAMPLES

In examples 1 to 26 and comparative example, a comparison was made as to the occurrence rate of flaws (bares) on the tire surface and the occurrence rate of the entry (1 mm) of rubber residues into the gap (gas venting passage E).

Examples 1 to 26

Tire vulcanization was performed by using the tire mold of the above-described embodiment. The detailed setting of the tire mold of the present embodiment is as shown in FIG. 5 and FIG. 6.

Comparative Example

Tire vulcanization was performed by using the conventional tire mold (the tire mold of the above-mentioned patent document). The detailed setting of the conventional tire mold is as follows:
  the number of vent lines in the circumferential direction: 3;
  the number of vent lines in the radial direction: 24;
  the number of paths: 24;
  the cross-sectional shape of a first path: V shape;
  the depth of the first path: 0.8 mm;
  the width of the first path: 0.8 mm;
  the length of the first path: 2.8 mm;
  the cross-sectional shape of a second path: V shape;
  the depth of the second path: 0.2 mm; and
  the width of the second path: 0.2 mm.

Test Contents

Regarding an ATV tire (size: 25×10.00-12), after preliminary vulcanization of 1000 tires was performed, vulcanization of 1000 tires was performed.

Test Results

The results are shown in FIG. 5 and FIG. 6. The following were confirmed by FIG. 5 and FIG. 6:

In all the cases of the examples, the occurrence rate of flaws (bares) on the tire surface and the occurrence rate of the entry (1 mm) of rubber residues into the gap (gas venting passage E) are lower than in the case of the comparative example.

The difference in effect due to the difference in knurling configuration (diamond knurling, straight knurling) was confirmed by examples 1 and 2.

Moreover, regarding the knurled grooves 15, the optimum value of the width was confirmed by examples 3 to 6 (See the parts enclosed by thick lines in FIG. 5 and FIG. 6. Ditto for the following.), and the optimum value of the height from the bottom to the peak of the knurled grooves 15 was confirmed by examples 7 to 10.

The optimum value of the outside diameter difference between the first outer peripheral surface 111 and the second outer peripheral surface 112 (outside diameter difference from the reference surface of the small outside diameter part) was confirmed by examples 11 to 14.

Further, regarding the vent grooves 13 (the grooves provided in an upper part of the bead ring), the optimum value of the width was confirmed by examples 15 to 18, the optimum value of the depth was confirmed by examples 19 to 22, and the optimum value of the number was confirmed by examples 23 to 26.

As the results, it was confirmed that the optimum conditions were as follows: The knurling type was a diamond knurling, the width of the knurled grooves 15 was 12 mm, the height from the bottom to the peak of the knurled grooves 15 was 0.62 mm, the outside diameter difference between the first outer peripheral surface 111 and the second outer peripheral surface 112 was 3.0 mm, and the width, depth and number of vent grooves 13 were 2.0 mm, 1.0 mm and 18, respectively (see example 1).

While the present invention has been described based on the embodiment, the present invention is not limited to the above-described embodiment. Various modifications may be made to the above-described embodiment within the scope the same as or equivalent to that of the present invention.

DESCRIPTION OF THE REFERENCE NUMERALS 10 bead ring
11 outer peripheral surface
12 outer side surface
13 vent groove
14 cavity surface
15 knurled groove
20 side plate
30 tread plate
80 bladder
90 green tire
91 bead part
111 first outer peripheral surface
112 second outer peripheral surface

What is claimed is:

1. A tire mold comprising: a pair of side plates; a pair of bead rings abutting on the side plates; and a gas venting passage lying between the side plates and the bead rings, wherein
  each of the bead rings has: a cavity surface; an outer side surface situated opposite to the cavity surface; and an outer peripheral surface connecting the cavity surface and the outer side surface,
  the outer peripheral surface has two regions in a direction of a bead ring thickness, one region being referred to as a first outer peripheral surface adjoining the cavity surface and the other region being referred to as a second outer peripheral surface adjoining the outer side surface,
  a first gap is lying between the first outer peripheral surface and the side plate by the presence of a knurled groove on the first outer peripheral surface,
  a second gap is lying between the second outer peripheral surface and the side plate by making an outside diameter of the second outer peripheral surface smaller than an outside diameter of the first outer peripheral surface,
  a third gap is lying between the outer side surface and the side plate by the presence of a plurality of vent grooves on the outer side surface, and
  the first to third gaps function as the gas venting passage.

2. The tire mold according to claim 1, wherein a width of the knurled groove constituting a grooved section of the first outer peripheral surface is 8 to 16 mm.

3. The tire mold according to claim 1, wherein the knurled groove is a diamond knurling, the knurling pitch is 1.3 to 2.0 mm, and the height from a bottom to a peak of the knurled groove is 0.54 to 0.83 mm.

4. The tire mold according to claim 1, wherein the outside diameter of the second outer peripheral surface is smaller than the outside diameter of the first outer peripheral surface by 2.0 to 4.0 mm.

5. The tire mold according to claim 1, wherein the width of each of the vent grooves is 1.0 to 4.0 mm and the depth of each of the vent grooves is 0.5 to 1.5 mm.

6. The tire mold according to claim 1, wherein the number of the vent grooves is four to 30.

7. The tire mold according to claim 2, wherein the knurled groove is a diamond knurling, the knurling pitch is 1.3 to 2.0 mm, and the height from a bottom to a peak of the knurled groove is 0.54 to 0.83 mm.

8. The tire mold according to claim 2, wherein the outside diameter of the second outer peripheral surface is smaller than the outside diameter of the first outer peripheral surface by 2.0 to 4.0 mm.

9. The tire mold according to claim 3, wherein the outside diameter of the second outer peripheral surface is smaller than the outside diameter of the first outer peripheral surface by 2.0 to 4.0 mm.

10. The tire mold according to claim 2, wherein the width of each of the vent grooves is 1.0 to 4.0 mm and the depth of each of the vent grooves is 0.5 to 1.5 mm.

11. The tire mold according to claim 3, wherein the width of each of the vent grooves is 1.0 to 4.0 mm and the depth of each of the vent grooves is 0.5 to 1.5 mm.

12. The tire mold according to claim 4, wherein the width of each of the vent grooves is 1.0 to 4.0 mm and the depth of each of the vent grooves is 0.5 to 1.5 mm.

13. The tire mold according to claim 2, wherein the number of the vent grooves is four to 30.

14. The tire mold according to claim 3, wherein the number of the vent grooves is four to 30.

15. The tire mold according to claim 4, wherein the number of the vent grooves is four to 30.

16. The tire mold according to claim 5, wherein the number of the vent grooves is four to 30.

\* \* \* \* \*